United States Patent
Ebel et al.

(10) Patent No.: US 6,707,661 B2
(45) Date of Patent: Mar. 16, 2004

(54) ETHYLENE GLYCOL MIXTURE AND AN ALUMINUM ELECTROLYTIC CAPACITOR USING THE MIXTURE

(75) Inventors: Thomas Ebel, Milan (IT); Wilhelm Lauer, Giengen (DE)

(73) Assignee: EPCOS AG, München (DE)

( * ) Notice: Subject to any disclaimer, the term of this patent is extended or adjusted under 35 U.S.C. 154(b) by 0 days.

(21) Appl. No.: 10/240,644
(22) PCT Filed: Mar. 9, 2001
(86) PCT No.: PCT/DE01/00910
§ 371 (c)(1),
(2), (4) Date: Oct. 3, 2002
(87) PCT Pub. No.: WO01/78095
PCT Pub. Date: Oct. 18, 2001

(65) Prior Publication Data
US 2003/0089879 A1 May 15, 2003

(30) Foreign Application Priority Data
Apr. 5, 2000 (DE) .......................... 100 16 866

(51) Int. Cl.$^7$ .......................... H01G 9/02; H01G 9/042; H01G 4/32
(52) U.S. Cl. .................. 361/506; 361/509; 361/511; 252/62.2
(58) Field of Search ............... 361/503–522; 252/62.2

(56) References Cited

U.S. PATENT DOCUMENTS 6,166,899 A * 12/2000 Tamamitsu ................. 361/504

FOREIGN PATENT DOCUMENTS

WO   WO 97/39465   10/1997

OTHER PUBLICATIONS

Abstract of Japanese Application 54–00695 of Mar. 30, 1979, *Database WPI*.
Abstract of Japanese Published Application 02 297916 of Dec. 10, 1990, *Patent Abstracts of Japan*, vol. 15, No. 078 (E–1037), Feb. 22, 1991.

* cited by examiner

*Primary Examiner*—Dean A. Reichard
*Assistant Examiner*—Eric Thomas
(74) *Attorney, Agent, or Firm*—Schiff Hardin LLP

(57) ABSTRACT

The invention is directed to an ethylene glycol mixture that also includes diethylene glycol monobutylether in addition to ethylene glycol and sorbitol. As a result thereof the ethylene glycol mixture exhibits a high dielectric strength (up to 66 V), a low water content and self-extinguishing properties for employment as electrolyte in an aluminum electrolytic capacitor. The invention is also directed to an aluminum electrolytic capacitor with the ethylene glycol mixture and to the employment of the ethylene glycol mixture in aluminum electrolytic capacitors for voltages up to 600 V.

8 Claims, 1 Drawing Sheet

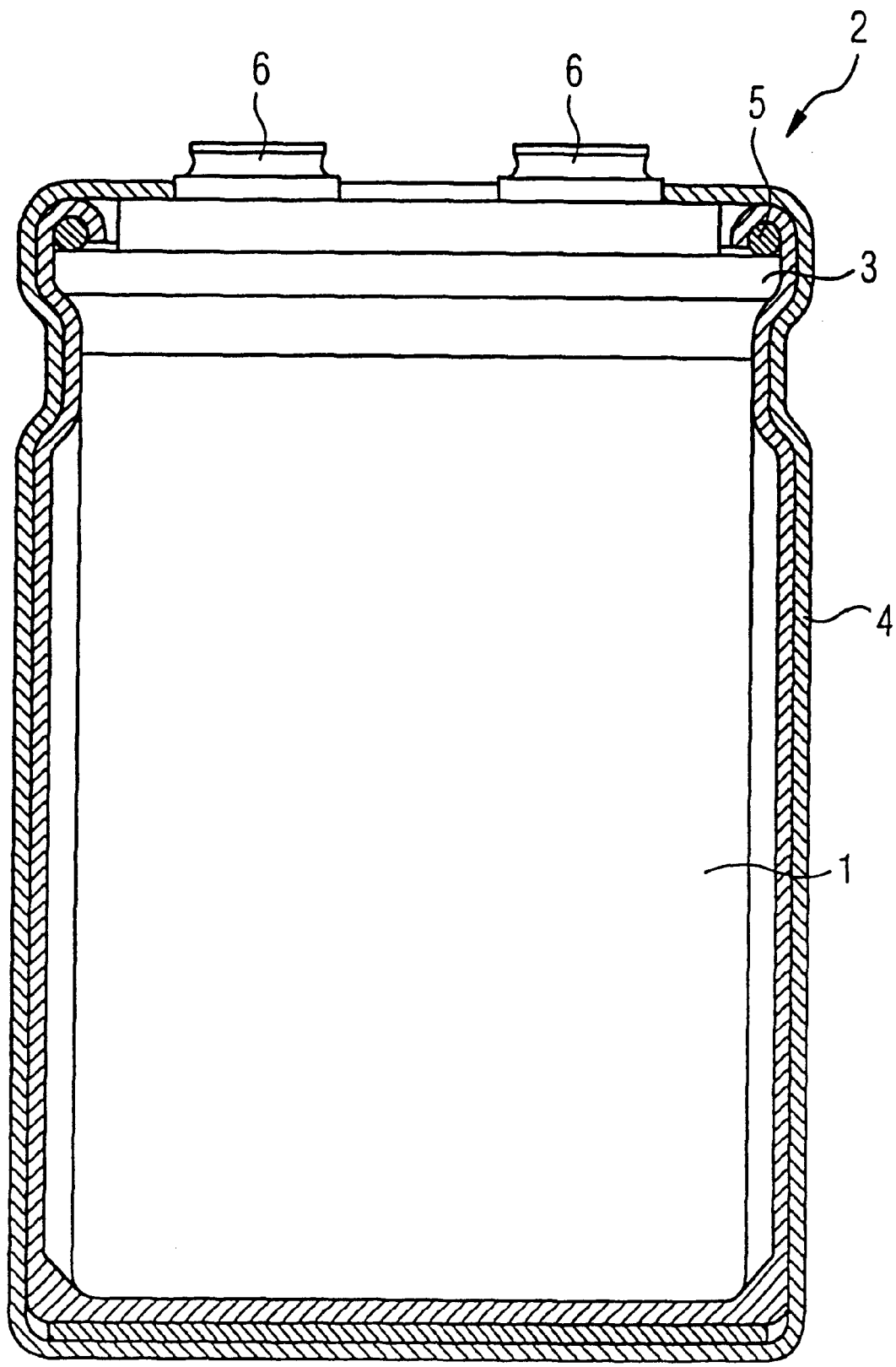

ETHYLENE GLYCOL MIXTURE AND AN ALUMINUM ELECTROLYTIC CAPACITOR USING THE MIXTURE

BACKGROUND OF THE INVENTION

The invention is directed to an ethylene glycol mixture with ethylene glycol and sorbitol. The invention is also directed to an aluminum electrolytic capacitor with the ethylene glycol mixture as the electrolyte. Over and above this, the invention is directed to the employment of the ethylene glycol mixture.

Ethylene glycol mixtures of the species initially cited that contain ammonium pentaborate ($NH_4B_5O_8 \times 4\ H_2O$) are known. The ammonium pentaborate forms ions in the ethylene glycol, so that the known ethylene glycol mixtures can be employed as the electrolyte in aluminum electrolytic capacitors. Aluminum electrolytic capacitors are constructed of a cathode foil that, for example, can be a thin, roughened aluminum foil with a thickness between 20 and 50 $\mu$m and of an anode foil that, for example, can be an approximately 100 $\mu$m thick, roughened aluminum foil and that comprises a dielectrically active oxide layer that is directly applied on the foil with electrochemical processes. A single-ply or multi-ply paper layer that is impregnated with the operating electrolyte is situated between the foils. This operating electrolyte represents the actual cathode. The foils are usually executed as a winding wound on a winding mandrel.

For currently standard capacitors having a wound implementation, these components are built into an aluminum pot after the impregnation. This is terminated with a termination disk having electrical lead-throughs for contacting the anode and the cathode and is sealed with a seal in order to avoid evaporation losses of the electrolyte at a high operating temperature.

The known ethylene glycol mixtures have the disadvantage that water is released when the ammonium pentaborate is dissolved in ethylene glycol. This water, on the one hand, in fact, increases the conductivity of the operating electrolyte, which is desirable for the purpose of a low effective resistance of the capacitor, but, on the other hand, also lowers the spark voltage, so that aluminum electrolytic capacitors having such electrolytes cannot be reliably operated given operating voltages of >500 V. Moreover, water attacks the oxide layer of the anode (residual current problem) and forms $H_2$ gas at the cathode foil that chemically attacks the aluminum.

In addition, an electrolyte for aluminum electrolytic capacitors is also known that contains γ-butyrolactone. Above all, this electrolyte has the disadvantage that it is easily ignited, which greatly increases the fire risk given dielectric breakdowns in the capacitor due to over-voltages. Moreover, specific and expensive material must be employed for the terminating disk given such electrolytes because of the chemical aggressivity of the solvent.

SUMMARY OF THE INVENTION

It is therefore a goal of the present invention to specify an ethylene glycol mixture that is suitable as an electrolyte for an aluminum electrolyte capacitor and that exhibits a low chemical aggressivity, a reduced flammability and a high dielectric strength with respect to over-voltages.

This goal is inventively achieved by an ethylene glycol comprising:
 a) 40–85 weight percent ethylene glycol;
 b) 1–25 weight percent adipic acid;
 c) 5–20 weight percent sorbitol;
 d) 0.5–1.5 weight percent phosphoric acid;
 e) 0.5–2.0 weight percent $NH_3$;
 f) 3–40 weight percent diethylene glycol monobutylether; and
 g) 5–18 weight percent $B_2O_3$.

In addition to these essential constituents, the inventive ethylene glycol mixture can also contain slight quantities of other, standard constituents that do not deteriorate the desired properties of the mixture.

The inventive ethylene glycol mixture has the advantage that it exhibits a high dielectric strength due to the diethylene glycol monobutylether part. It is therefore extremely well-suited for utilization as an electrolyte in an aluminum electrolytic capacitor, since dielectric breakdowns are not that easily triggered given over-voltages.

Over and above this, the inventive ethylene glycol mixture has the advantage that it comprises a low water content due to the addition of $B_2O_3$ (the anhydride of boric acid) instead of the known ammonium pentaborate. The lower water content particularly derives therefrom that the ammonium pentaborate forms more water than an equivalent quantity of $B_2O_3$ in the esterification reaction with the solvents.

In addition, the inventive ethylene glycol mixture has the advantage that it exhibits a low chemical aggressivity. As a result thereof, the inventive ethylene glycol mixture is very well-suited as an electrolyte for an aluminum electrolytic capacitor that is built into a multi-component housing. The housing can be protected against run-out of the electrolyte by being closed with a simple closure element that need not be especially chemically resistant.

Given a pot-shaped aluminum housing normally employed for an aluminum electrolytic capacitor, for example, a phenol resin disk that is sealed with a rubber ring suffices as closure element. Such a phenol resin disk is inexpensive to acquire and simple to process.

Over and above this, the inventive ethylene glycol mixture has the advantage that it comprises self-extinguishing properties. Given use of the inventive ethylene glycol mixture as electrolyte in aluminum electrolytic capacitors, the fire hazard in case of spark-overs is therefore noticeably diminished.

Over and above this, an ethylene glycol mixture that comprises:
 a) 50–60 weight percent ethylene glycol;
 b) 2–3 weight percent adipic acid;
 c) 10–15 weight percent sorbitol;
 d) 0.7–1.0 weight percent phosphoric acid;
 e) 1.2–2.0 weight percent $NH_3$;
 f) 10–15 weight percent diethylene glycol monobutylether; and
 g) 10–15 weight percent $B_2O_3$ is especially advantageous.

In addition to these essential constituents, the inventive ethylene glycol mixture can also contain slight quantities of other, standard constituents that do not deteriorate the desired properties of the mixture.

Such an ethylene glycol mixture has the advantage that it exhibits a spark voltage of 560–600 Volts given an operating temperature of 85° C. Over and above this, it has the advantage that it exhibits a flash point of 125° C. and, thus, a very low flammability.

In addition, the invention is directed to an aluminum electrolytic capacitor wherein the electrolyte is the inventive ethylene glycol mixture. It comprises a layer stack with an anode layer and a cathode layer between which a parting layer saturated with the electrolyte is arranged. The layer stack is installed in a multi-component housing that is terminated by a closure element.

Due to the employment of the inventive ethylene glycol mixture, the aluminum electrolytic capacitor exhibits the advantage that it is suited for operating voltages between 500 and 600 Volts. This suitability essentially results from the high dielectric strength of the inventive ethylene glycol mixture.

Further, the inventive aluminum electrolytic capacitor has the advantage that a closure element of phenol resin can be especially advantageously employed. Phenol resin is an inexpensive material that can also be worked especially easily.

The invention also specifies the employment of the ethylene glycol mixture as electrolyte in an aluminum electrolytic capacitor for voltages between 500 and 600 Volts. Due to the high dielectric strength, the inventive ethylene glycol mixture has the advantage that it is suited as electrolyte for an aluminum electrolytic capacitor for voltages up to 600 Volts.

The invention shall be explained in greater detail below on the basis of an exemplary embodiment and the FIGURE pertaining thereto.

BRIEF DESCRIPTION OF THE DRAWINGS

The FIGURE shows a schematic cross-sectional view of an inventive aluminum electrolytic capacitor.

DESCRIPTION OF THE PREFERRED EMBODIMENTS

The FIGURE shows an aluminum electrolytic capacitor wherein a layer stack 1 of anode and cathode layers as well as an intervening parting layer is fashioned in the form of a winding that contains the parting layer in the form of a paper layer. The paper layer is saturated with the inventive ethylene glycol mixture, which forms the electrolyte.

The winding is built into a multi-component housing 2 that comprises a pot 4 that is closed with a closure element 3. The pot 4 can, for example, be an aluminum pot. The closure element 3 is preferably implemented as a phenol resin disk and prevents the electrolyte from running out of the pot 4. The housing 2 is also sealed from the outside by a seal 5 composed of a rubber ring, as a result whereof the electrolyte is prevented from drying out.

The anode and cathode layers are conductively connected to outwardly projecting terminal elements 6 by means of corresponding lead-throughs in the closure element 3.

The invention is not limited to the embodiment shown by way of example but is defined in its broadest form by the claims.

We claim:

1. An ethylene glycol mixture comprising:
    40–85 weight percent ethylene glycol,
    1–25 weight percent adipic acid,
    5–20 weight percent sorbitol,
    0.5–1.5 weight percent phosphoric acid,
    0.5–2.0 weight percent $NH_3$,
    3–40 weight percent diethylene glycol monobutylether, and
    5–18 weight percent $B_2O_3$.

2. An ethylene glycol mixture according to claim 1, comprising:
    50–60 weight percent ethylene glycol,
    2–3 weight percent adipic acid,
    10–15 weight percent sorbitol,
    0.7–1.0 weight percent phosphoric acid,
    1.2–2.0 weight percent $NH_3$,
    10–15 weight percent diethylene glycol monobutylether, and
    10–15 weight percent $B_2O_3$.

3. An aluminum electrolyte capacitor comprising a housing containing a layer stack having an anode layer, a cathode layer and an intervening parting layer saturated with an electrolyte; and a closure element closing the housing, said electrolyte being an ethylene glycol mixture comprising:
    40–85 weight percent ethylene glycol,
    1–25 weight percent adipic acid,
    5–20 weight percent sorbitol,
    0.5–1.5 weight percent phosphoric acid,
    0.5–2.0 weight percent $NH_3$,
    3–40 weight percent diethylene glycol monobutylether, and
    5–18 weight percent $B_2O_3$.

4. An aluminum electrolytic capacitor according to claim 3, wherein the closure element is composed of phenol resin.

5. An aluminum electrolytic capacitor according to claim 3, wherein the capacitor is for voltages between 500 and 600V.

6. An aluminum electrolytic capacitor according to claim 3, wherein the ethylene glycol mixture comprises:
    50–60 weight percent ethylene glycol,
    2–3 weight percent adipic acid,
    10–15 weight percent sorbitol,
    0.7–1.0 weight percent phosphoric acid,
    1.2–2.0 weight percent $NH_3$,
    10–15 weight percent diethylene glycol monobutylether, and
    10–15 weight percent $B_2O_3$.

7. An aluminum electrolytic capacitor according to claim 6, wherein the capacitor is for voltages between 500 and 600V.

8. An aluminum electrolytic capacitor according to claim 6, wherein the closure element is composed of phenol resin.

* * * * *

UNITED STATES PATENT AND TRADEMARK OFFICE
CERTIFICATE OF CORRECTION

PATENT NO. : 6,707,661 B2
DATED : March 16, 2004
INVENTOR(S) : Thomas Ebel and Wilhelm Lauer It is certified that error appears in the above-identified patent and that said Letters Patent is hereby corrected as shown below:

Title page,
Item [56], References Cited, OTHER PUBLICATIONS, correct "Abstract of Japanese Application 54-00695" to read -- Abstract of Japanese Application 54-006695. --

Signed and Sealed this

Ninth Day of August, 2005

JON W. DUDAS
*Director of the United States Patent and Trademark Office*